US011962015B2

(12) United States Patent
Chuang et al.

(10) Patent No.: US 11,962,015 B2
(45) Date of Patent: Apr. 16, 2024

(54) ELECTROLYTIC COPPER FOIL AND ELECTRODE AND LITHIUM-ION CELL COMPRISING THE SAME

(71) Applicant: CHANG CHUN PETROCHEMICAL CO., LTD., Taipei (TW)

(72) Inventors: Ting-Mu Chuang, Taipei (TW); Sung-Shiuan Lin, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 17/940,425

(22) Filed: Sep. 8, 2022

(65) Prior Publication Data

US 2023/0420688 A1 Dec. 28, 2023

(30) Foreign Application Priority Data

Jun. 28, 2022 (CN) .......................... 202210740028.3
Jun. 28, 2022 (TW) .................................. 111124125

(51) Int. Cl.
*H01M 10/0525* (2010.01)
*H01M 4/66* (2006.01)
*H01M 4/02* (2006.01)

(52) U.S. Cl.
CPC ...... *H01M 4/661* (2013.01); *H01M 2004/021* (2013.01); *H01M 10/0525* (2013.01)

(58) Field of Classification Search
CPC ............. H01M 4/661; H01M 10/0525; H01M 2004/021
See application file for complete search history.

(56) References Cited

U.S. PATENT DOCUMENTS

2017/0107552 A1* 4/2017 Hiller .................. C12N 5/0018
2017/0117552 A1* 4/2017 Jeong .................... H01M 4/661
(Continued)

FOREIGN PATENT DOCUMENTS

CN 104583461 4/2015
CN 108075098 B 11/2021
(Continued)

OTHER PUBLICATIONS

Patent approval decision of Taiwan Patent Application No. 111124125, receipt date: Mar. 3, 2023.
Examination Report of Japan Patent Application No. 2022152573, Jun. 13, 2023.
(Continued)

*Primary Examiner* — Jane J Rhee
(74) *Attorney, Agent, or Firm* — WPAT, PC (57) ABSTRACT

Provided are an electrolytic copper foil, an electrode and a lithium-ion cell comprising the same. The electrolytic copper foil has a first surface and a second surface opposite the first surface. An absolute difference of the FWHM of the characteristic peaks of (111) planes of the first surface and the second surface analyzed by GIXRD is less than 0.14, the first and the second surfaces each have a nanoindentation hardness of 0.3 GPa to 3.0 GPa, and the yield strength of the electrolytic copper foil is more than 230 MPa. By controlling the absolute difference of the FWHM of the characteristic peaks of (111) plane of these two surfaces, the nanoindentation hardness of these two surfaces and the yield strength, the electrolytic copper foil can have improved tolerance to the repeated charging and discharging and reduced warpage, thereby improving the yield rate and value of the lithium-ion cell.

20 Claims, 2 Drawing Sheets

(56) References Cited

U.S. PATENT DOCUMENTS

| | | | |
|---|---|---|---|
| 2018/0062199 A1 | 3/2018 | Kim | |
| 2019/0123358 A1* | 4/2019 | Kudo | H01M 4/661 |
| 2020/0083539 A1 | 3/2020 | Chen et al. | |
| 2020/0295378 A1* | 9/2020 | Lai | H01G 4/008 |
| 2022/0102730 A1 | 3/2022 | Chiu | |

FOREIGN PATENT DOCUMENTS

| | | |
|---|---|---|
| JP | 6379207 | 8/2018 |
| JP | 2020147844 | 9/2020 |
| JP | 2022520487 | 3/2022 |
| JP | 7153148 | 10/2022 |
| TW | 202041720 | 11/2020 |

OTHER PUBLICATIONS

Examination Report of Korea Patent Application No. 10-2022-0152577, Aug. 16, 2023.
Merchant et al., Grain structure of thin electrodeposited and rolled copper foils, Dec. 2004.
Artaki et al., Copper Foil Characterization and Cleanliness Testing, Jan. 1991.
Hajjami et al., Characterization of thin Zn—Ni alloy coatings electrodeposited on low carbon steel, Nov. 2007.
Kakizaki Koichi, D8 Advance Eco, forum in Forum, Feb. 2016.
Saitama University Cyber Repository of Academic Resources (SUCRA) webpage.
Bruker AXS, D8 Advance Eco, 2013.
Tosoh, [Technical data] Evaluation of crystallinity of polymer surfaces using small angle incidence X-ray diffraction method, Aug. 2018.

* cited by examiner

ELECTROLYTIC COPPER FOIL AND ELECTRODE AND LITHIUM-ION CELL COMPRISING THE SAME

CROSS-REFERENCE TO RELATED APPLICATION

Pursuant to 35 U.S.C. § 119(a), this application claims the benefits of the priorities of Taiwan Patent Application No. 111124125 and China Patent Application No. 202210740028.3 both filed on Jun. 28, 2022. The contents of the prior applications are incorporated herein by their entirety.

BACKGROUND OF THE INVENTION

1. Field of the Invention

The invention relates to an electrolytic copper foil, particularly to an electrolytic copper foil for a lithium-ion cell, an electrode comprising the same, and a lithium-ion cell.

2. Description of the Prior Arts

Copper foil has good electrical conductivity and lower cost compared to precious metals such as silver. It has been widely applied in basic industries and become an important starting material in advanced technology industries. For instance, copper foil can be used as an electrode material for a lithium-ion cell, which is widely applied in the fields of portable electronic devices (PED), electric vehicles (EV), and energy storage systems (ESS).

Being the electrode material of a lithium-ion cell, the copper foil is coated with the active materials. However, the active materials would expand and contract during the repeated charge and discharge cycles, resulting in the deformation of the copper foil. Copper foil of poor mechanical strength would be damaged and broken during the repeated charge and discharge cycles, and even the lithium-ion cell would be damaged.

In addition, the active materials are coated on the copper foil in the preparation of the lithium-ion cell. If the copper foil is not flat and warped at corners, the active materials cannot be well coated on the copper foil, and thus the yield rates of the electrode and lithium-ion cell are reduced in the subsequent preparation.

Therefore, there is still room for improvement of the tolerance to the repeated charge and discharge cycles, mitigation of the level of warpage, and increase of the yield rate of the electrode and lithium-ion cell.

SUMMARY OF THE INVENTION

In view of the shortcomings, one of the objectives of the instant disclosure is to provide an improved copper foil which exhibits good tolerance to the repeated charging and discharging when it is used in an electrode of a lithium-ion cell.

Another objective of the instant disclosure is to provide an improved copper foil having a flat surface, and thus the level of warpage of the copper foil can be effectively mitigated.

Still another objective of the instant disclosure is to provide an improved copper foil and increase the yield rate and value of the current collector, the electrode, and the lithium-ion cell in the subsequent applications.

To achieve the aforesaid objectives, the instant disclosure provides an electrolytic copper foil comprising a first surface and a second surface opposite the first surface. An absolute difference of a full width at half maximum (FWHM) of a characteristic peak of (111) plane of the first surface and an FWHM of a characteristic peak of (111) plane of the second surface analyzed by grazing incidence X-ray diffraction (GIXRD) is less than 0.14. The first surface and the second surface each have a nanoindentation hardness more than or equal to 0.3 gigapascals (GPa) and less than or equal to 3.0 GPa. And, a yield strength of the electrolytic copper foil is more than 230 megapascals (MPa).

By controlling the absolute difference of the FWHM of the characteristic peaks of (111) plane of the first and second surfaces, the nanoindentation hardness of the first and second surfaces, and the yield strength of the electrolytic copper foil, the electrolytic copper foil can have improved tolerance to the repeated charging and discharging and reduced level of warpage. Therefore, the electrolytic copper foil can be used as a current collector material with good tolerance and improves the yield rate and value of a lithium-ion cell.

Preferably, the FWHM of the characteristic peaks of (111) planes of the first surface and the second surface may each independently be 0.10 to 0.38. More preferably, the FWHM of the characteristic peaks of (111) planes of the first surface and the second surface may each independently be 0.13 to 0.38. In one embodiment, the FWHM of the characteristic peaks of (111) planes of the first surface and the second surface may each independently be 0.13 to 0.27. In another embodiment, the FWHM of the characteristic peak of (111) plane of the first surface may be 0.13 to 0.38, and the FWHM of the characteristic peak of (111) plane of the second surface may be 0.20 to 0.30.

Preferably, the absolute difference between the FWHM of the characteristic peak of (111) plane of the first surface and the FWHM of the characteristic peak of (111) plane of the second surface may be 0.135 or less. More preferably, the absolute difference between the FWHM of the characteristic peak of (111) plane of the first surface and the FWHM of the characteristic peak of (111) plane of the second surface may be 0.010 to 0.135. The inventor found that the electrolytic copper foil encounters severe warpage problem and inferior tolerance to the repeated charging and discharging when the absolute difference of the FWHM of the characteristic peaks of (111) planes of the first surface and the second surface is 0.14 or more.

Preferably, the nanoindentation hardness of the first surface and the nanoindentation hardness of the second surface of the electrolytic copper foil may each independently be 0.4 GPa to 2.5 GPa. More preferably, the nanoindentation hardness of the first surface and the nanoindentation hardness of the second surface may each independently be 0.4 GPa to 2.3 GPa. In one embodiment, the nanoindentation hardness of the first surface of the electrolytic copper foil may be 0.3 GPa to 3.0 GPa, and the nanoindentation hardness of the second surface of the electrolytic copper foil may be 1.0 GPa to 2.0 GPa. In another embodiment, the nanoindentation hardness of the first surface of the electrolytic copper foil may be 0.4 GPa to 2.5 GPa, and the nanoindentation hardness of the second surface of the electrolytic copper foil may be 1.0 GPa to 2.0 GPa. The inventor found that the electrolytic copper foil having a nanoindentation hardness more than 3.0 GPa on any surface thereof is too hard and brittle when it is used as a current collector of a lithium-ion cell, so that cracks and fractures are easily generated and the coated active materials are detached from surface during the charge and discharge. Accordingly, the tolerance to the repeated charging and discharging is reduced. On the other hand, the electrolytic copper foil having a nanoindentation hardness less than 0.3 GPa on any surface thereof has excessively low surface strength, such that cracks and fractures are easily generated. The tolerance to the repeated charging and discharging is also reduced.

Preferably, an absolute difference of the nanoindentation hardness of the first surface and the nanoindentation hardness of the second surface of the electrolytic copper foil may be 1.0 GPa or less. More preferably, the absolute difference of the nanoindentation hardness of the first surface and the nanoindentation hardness of the second surface of the electrolytic copper foil may be 0.1 GPa to 1.0 GPa.

Preferably, the yield strength of the electrolytic copper foil may be 240 MPa or more. More preferably, the yield strength of the electrolytic copper foil may be more than or equal to 240 MPa and less than or equal to 500 MPa.

In one embodiment, a thickness of the electrolytic copper foil may be 4 micrometers (μm) to 20 μm. In another embodiment, the thickness of the electrolytic copper foil may be 6 μm to 20 μm.

The instant disclosure also provides an electrode of a lithium-ion cell, which comprises the aforesaid electrolytic copper foil.

Moreover, the instant disclosure provides a lithium-ion cell, which comprises the aforesaid electrode.

In accordance with the instant disclosure, the electrolytic copper foil is applicable as a negative electrode of a lithium-ion cell and a positive electrode of a lithium-ion cell. Aforesaid electrolytic copper foil is applicable to be a current collector. One or both of the surfaces of electrolytic copper foil may be coated with at least one layer of active materials to prepare an electrode of a lithium-ion cell.

In accordance with the instant disclosure, the active material may be divided into positive electrode active material and negative electrode active material. The negative electrode active substance contained in the negative electrode active material may be a carbon-containing substance, a silicon-containing substance, a silicon carbide composite, a metal, a metal oxide, a metal alloy or a polymer, wherein the carbon-containing substance or the silicon-containing substance is preferable, but it is not limited thereto. Specifically, the carbon-containing substance may be, but is not limited to, a mesophase graphite powder (MGP), a non-graphitizing carbon, a coke, a graphite, a glasslike carbon, a carbon fiber, an activated carbon, a carbon black or a high polymer calcined substance. The coke may comprise pitch coke, needle coke or petroleum coke, etc. The high polymer calcined substance may be obtained by calcining a phenol-formaldehyde resin or a furan resin at a suitable temperature for carbonation. The silicon-containing substance may have an excellent ability to form an alloy with lithium ions and an excellent ability to extract lithium ions from the lithium alloy. When the silicon-containing substance is applied to a lithium-ion secondary cell, a high energy density secondary cell can be achieved. The silicon-containing substance may be combined with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), chromium (Cr), ruthenium (Ru), molybdenum (Mo), or combinations thereof to form an alloy. The element of the metal or metal alloy may be selected from the group consisting of Co, Fe, Sn, Ni, Cu, Mn, Zn, In, Ag, Ti, Ge, Bi, Sb, Cr, Ru, and Mo, but it is not limited thereto. Examples of the aforesaid metal oxide may be, but is not limited to, ferric oxide, ferric ferrous oxide, ruthenium dioxide, molybdenum dioxide and molybdenum trioxide. Examples of the aforesaid polymers may include, but are not limited to, polyacetylene and polypyrrole.

In one embodiment, an auxiliary additive may be added into the active material depending on different needs. Aforesaid auxiliary additive may be, but is not limited to, an adhesive and/or a weak acid reagent. Preferably, the adhesive may be, but is not limited to, polyvinylidene fluoride (PVDF), styrene-butadiene rubber (SBR), carboxymethyl cellulose (CMC), poly(acrylic acid) (PAA), polyacrylonitrile (PAN) or polyacrylate, and the weak acid reagent may be, but is not limited to, oxalic acid, citric acid, lactic acid, acetic acid, or formic acid.

In accordance with the instant disclosure, depending on the positive electrode active substance, the lithium-ion cell may be classified into $LiCoO_2$ cell, $LiNiO_2$ cell, $LiMn_2O_4$ cell, $LiCo_xNi_{1-x}O_2$ cell, or $LiFePO_4$ cell, etc., but it is not limited thereto.

In accordance with the instant disclosure, the electrolyte solution may comprise a solvent, an electrolyte, or an additive added whenever appropriate. The solvent of the electrolyte solution may comprise a non-aqueous solvent, for example, a cyclic carbonate such as ethylene carbonate (EC) or propylene carbonate (PC); a linear carbonate such as dimethyl carbonate (DMC), diethyl carbonate (DEC), or ethyl methyl carbonate (EMC); or sultone, but it is not limited thereto. Aforesaid solvent may be used alone or in combination of two or more solvents. The electrolyte may comprise lithium hexafluorophosphate, lithium perchlorate, lithium tetrafluoroborate, lithium trifluoromethanesulfonate, lithium bis(oxalate)borate, or lithium bis(trifluoromethane sulfonimide), but it is not limited thereto.

In some embodiments, the electrolyte solution may be replaced by solid electrolyte, such as, but not limited to, crystalline electrolyte, glassy electrolyte, glass-ceramic electrolyte or polymer electrolyte, in a lithium-ion cell. Specifically, the crystalline electrolyte may be a sulfide solid electrolyte such as lithium superionic conductor (LISICON) or argyrodite, or an oxide solid electrolyte such as Garnet-type electrolyte, Peroskite-type electrolyte, NASICON-type electrolyte, but it is not limited thereto. The glassy electrolyte may be an oxide glass electrolyte or a sulfide glass electrolyte, but it is not limited thereto. The glass-ceramic electrolyte may be an oxide glass-ceramic electrolyte or a sulfide glass-ceramic electrolyte, but it is not limited thereto. The polymer electrolyte may be a pure solid polymer electrolyte, such as polyethylene oxide-based (PEO-based) electrolyte and polypropylene oxide-based (PPO-based) electrolyte; or a gel polymer electrolyte such as polyacrylonitrile-based (PAN-based) electrolyte, poly(methyl methacrylate)-based (PMMA-based) electrolyte, poly(vinyl chloride)-based (PVC-based) electrolyte, or poly(vinylidene fluoride)-based (PVDF-based) electrolyte, but it is not limited thereto.

In accordance with the instant disclosure, the aforesaid lithium-ion cell may be a stacked lithium-ion cell comprising the negative electrode and the positive electrode stacked through the separator, or may be a spirally-wound lithium-ion cell comprising a continuous electrode and the separator spirally wound and stacked together, but it is not limited thereto. Depending on various products, the lithium-ion cell of the instant disclosure may be applied as a cylindrical secondary cell, a square secondary cell, a pouch type secondary cell, or a coin type secondary cell for personal notebook computers, mobile phones, electric vehicles and energy storage systems, but it is not limited thereto.

DETAILED DESCRIPTION OF THE PREFERRED EMBODIMENTS

Hereinafter, several embodiments are described to illustrate the embodiments of an electrolytic copper foil, an electrode, and a lithium-ion cell of the instant disclosure, and several comparative examples are provided for comparison. One person skilled in the art can easily realize the advantages and effects of the present invention from the following examples and comparative examples. It should be understood that the descriptions proposed herein are just preferable examples for the purpose of illustrations only, not intended to limit the scope of the instant disclosure. One person skilled in the art can make various modifications and variations to practice or apply the instant disclosure in accordance with the ordinary knowledge without departing from the spirit and scope of the instant disclosure.

Figure 1:
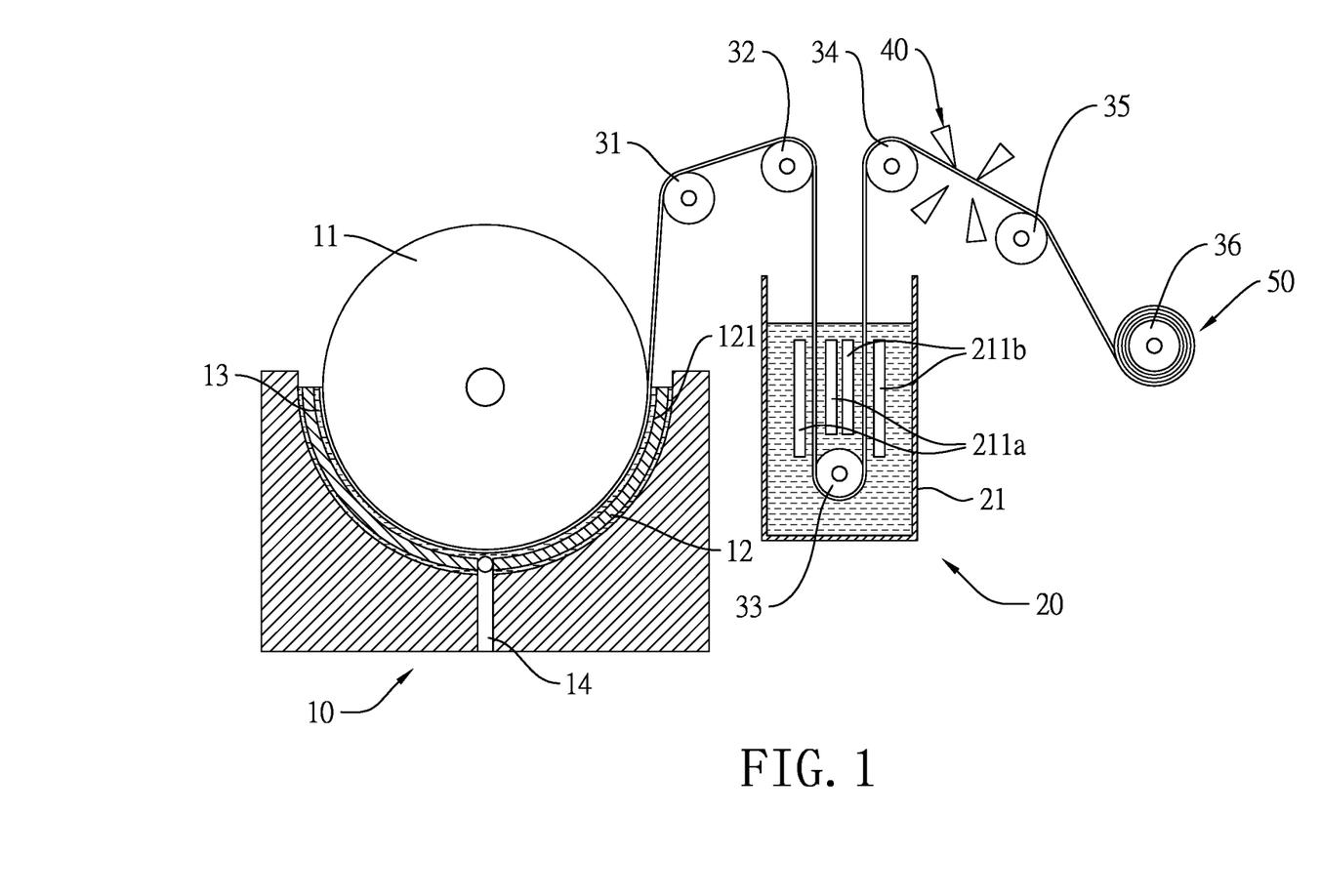
FIG. 1 is a schematic view of preparing electrolytic copper foils of Examples 1 to 10 and Comparative Examples 1 to 6.

As shown in FIG. 1, the production apparatus for producing the electrolytic copper foil comprises an electrodeposition equipment 10, an anti-tarnish treatment equipment 20, and a series of guide rollers. The electrodeposition equipment 10 comprises a cathode drum 11, an insoluble anode 12, a copper electrolyte solution 13 and a feed pipe 14. The cathode drum 11 is a rotatable titanium cathode drum. The insoluble anode 12 is an $IrO_2$ coated titanium plate set below the cathode drum 11 and substantially surrounds the lower half of the cathode drum 11. The insoluble anode 12 has an anode surface 121 facing the cathode drum 11. The cathode drum 11 and the insoluble anode 12 are spaced apart from each other to accommodate the copper electrolyte solution 13 introduced through the feed pipe 14. The anti-tarnish treatment equipment 20 comprises an anti-tarnish treatment tank 21 and two sets of anode plates 211a and 211b disposed therein. The series of guide rollers comprise a first guide roller 31, a second guide roller 32, a third guide roller 33, a fourth guide roller 34, a fifth guide roller 35, and a sixth guide roller 36. Aforesaid guide rollers can transport a raw copper foil prepared by electrodeposition to the anti-tarnish treatment equipment 20 for anti-tarnish treatment, then excess anti-tarnish substances are removed from the surface of the anti-tarnish treated raw copper foil with an air knife 40, and finally the electrolytic copper foil 50 is wound on the sixth guide roller 36.

For preparation of the electrolytic copper foil of the instant disclosure, the parameters of electrodeposition can be modified depending on different needs. In one embodiment, the copper electrolyte solution used in electrodeposition may comprise copper sulfate, sulfuric acid, chloride ions, sodium 3-mercapto-1-propanesulfonate (MPS), collagen, and sodium ions, but it is not limited thereto. In said embodiment, the concentration of the copper sulfate may be 200 grams per liter (g/L) to 400 g/L, the concentration of the sulfuric acid may be 80 g/L to 150 g/L, the concentration of chloride ions may be 20 ppm to 60 ppm, the concentration of MPS may be 20 ppm to 30 ppm, the concentration of collagen may be 10 ppm to 40 ppm, the molecular weight of the collagen may be 1000 Daltons (Da) to 10000 Da, and the concentration of the sodium ions may be 10 ppm to 30 ppm. In the electrodeposition step, the temperature of the copper electrolyte solution may be 40° C. to 50° C., the current density may be set at 40 Amperes per square decimeter ($A/dm^2$) to 50 $A/dm^2$, and the roughness (Rz) of the anode surface may be 15 μm or less.

For preparation of the electrolytic copper foil of the instant disclosure, the anti-tarnish treatment can be adopted depending on different needs. The adopted anti-tarnish solution may be an organic anti-tarnish solution containing azoles or an inorganic anti-tarnish solution such as chromium anti-tarnish solution, nickel anti-tarnish solution, zinc anti-tarnish solution, tin anti-tarnish solution, etc. In one embodiment, the anti-tarnish solution may be chromium anti-tarnish solution in which the concentration of the chromic acid may be 1.5 g/L to 5.0 g/L. The current density of anti-tarnish treatment may be set at 0.5 $A/dm^2$ to 6.0 $A/dm^2$, the temperature of chromium anti-tarnish solution may be 20° C. to 40° C., the period of anti-tarnish treatment may be 2 seconds (sec) to 4 sec, but they are not limited thereto.

In accordance with the instant disclosure, the physical properties of the electrolytic copper foil can be modified by the composition of the copper electrolyte solution and related parameters in the electrodeposition step. For example, the nanoindentation hardness, the FWHM of the characteristic peaks of (111) planes, and the yield strength may be modified by, but not limited to, the amount of collagen, the amount of sodium ions, the roughness of the anode surface of the insoluble anode.

Electrolytic Copper Foil

Examples 1 to 10: Electrolytic Copper Foil

The electrolytic copper foils of Examples 1 to 10 were produced by similar electrodeposition step and anti-tarnish step with a production apparatus of FIG. 1. The method for producing the electrolytic copper foils of Examples 1 to 10 was described as follows.

First, the copper electrolyte solution 13 used in the electrodeposition step was prepared. During the electrodeposition step, the cathode drum 11 was rotated on a fixed axis at a constant speed and a current was applied between the cathode drum 11 and the insoluble anode 12, so that copper ions of the copper electrolyte solution 13 were electrodeposited on the surface of the cathode drum 11 to form the raw copper foil. Then the raw copper foil was stripped from the cathode drum 11 and guided to the first guide roller 31.

Herein, the composition of the copper electrolyte solution 13 and the parameters of the electrodeposition step were described as follows:

I. Composition of the Copper Electrolyte Solution 13:
  Copper sulfate ($CuSO_4 \cdot 5H_2O$): about 280 g/L;
  Sulfuric acid: about 90 g/L;
  Chloride ions ($Cl^-$): about 20 ppm;
  Sodium 3-mercapto-1-propanesulfonate (MPS, purchased from HOPAX): about 20 ppm;
  Collagen (molecular weight about 2500 Da): concentration as shown in Table 1; and
  Sodium ions ($Na^+$): concentration as shown in Table 1.

II. Parameters of the Electrodeposition Step:
  Temperature of the copper electrolyte solution 13: about 50° C.;
  Rz of anode surface: as shown in Table 1; and
  Current density: about 50 $A/dm^2$.
  Said Rz of the anode surface is directed to the maximum height defined by JIS B 0601-1994. The instrument and parameters of measuring Rz of the anode surface are described as follows:

I. Measurement Instrument:
Portable surface roughness tester (contact mode): SJ-410, purchased from Mitutoyo.

II. Measurement Parameters:
 Radius of needle tip: 2 μm;
 Angle of needle tip: 60°;
 Cut off length (kc): 0.8 millimeters (mm); and
 Evaluation length: 4 mm.

After that, the raw copper foil was transported by the first guide roller and the second guide roller 32 to the anti-tarnish treatment equipment 20, and the raw copper foil was immersed into the anti-tarnish treatment tank 21 filled with chromium anti-tarnish solution. Then the two opposite surfaces of the raw copper foil underwent anti-tarnish treatment by two sets of anode plates 211a and 211b through the transportation of the third guide roller 33, such that a first anti-tarnish layer and a second anti-tarnish layer were electrodeposited on the two opposite surfaces of the raw copper foil.

Herein, the composition of the chromium anti-tarnish solution and the parameters of the anti-tarnish treatment are described as follows:
 I. Composition of the Chromium Anti-Tarnish Solution:
 Chromic acid ($CrO_3$): about 1.5 g/L;
 II. Parameters of the Anti-Tarnish Treatment:
 Temperature of the solution: 25° C.;
 Current density: about 0.5 A/dm$^2$; and
 Processing time: about 2 seconds.

After the completion of the anti-tarnish treatment, the anti-tarnish treated copper foil was guided to the fourth guide roller 34. Excess anti-tarnish substances were removed from the surface and the anti-tarnish treated copper foil was dried by the air knife 40. Then aforesaid anti-tarnish treated copper foil was transported by the fifth guide roller 35 towards the sixth guide roller 36, and finally the electrolytic copper foil 50 was obtained and wound on the sixth guide roller 36.

Figure 2:
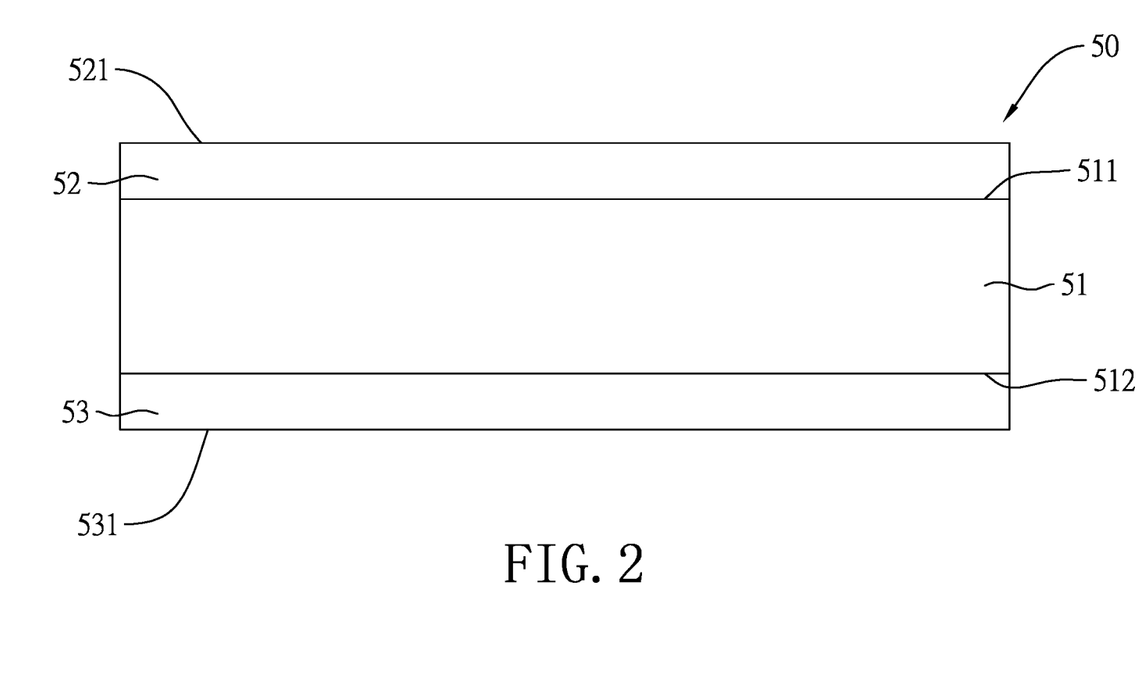
FIG. 2 is a schematic side view of the electrolytic copper foils of Examples 1 to 10 and Comparative Examples 1 to 6.

According to the aforesaid method, about 8 μm-thick electrolytic copper foils of Examples 1 to 8, about 6 μm-thick electrolytic copper foil of Example 9, and about 20 μm-thick electrolytic copper foil of Example 10 were obtained. The differences between Examples 1 to 10 were the thickness of the electrolytic copper foil, the concentrations of collagen and sodium ions in the copper electrolyte solution, and the roughness of the anode surface in the electrodeposition step. As shown in FIG. 2, the electrolytic copper foil 50 of each example comprises a copper layer 51 (corresponding to the raw copper foil which is not treated with the anti-tarnish treatment), a first anti-tarnish layer 52, and a second anti-tarnish layer 53. The copper layer 51 comprises a deposited side 511 and a drum side 512 opposite the deposited side 511. During the electrodeposition, the deposited side 511 was the surface of the raw copper foil facing the insoluble anode, and the drum side 512 was the surface of the raw copper foil in contact with the cathode drum. The first anti-tarnish layer 52 was formed on the deposited side 511 of the copper layer 51, and the first anti-tarnish layer 52 has a first surface 521 at the outermost. The second anti-tarnish layer 53 is formed on the drum side 512 of the copper layer 51, and the second anti-tarnish layer 53 has a second surface 531 at the outermost. The first surface 521 and the second surface 531 are the two outermost surfaces of the electrolytic copper foil 50, and they are opposite to each other.

Comparative Examples 1 to 6: Electrolytic Copper Foil

The electrolytic copper foils of Comparative Examples 1 to 6 were provided for comparison with Examples 1 to 10.

The method of producing the electrolytic copper foils of Comparative Examples 1 to 6 was similar to that of Examples 1 to 10, except the concentrations of collagen and sodium ions in the copper electrolyte solution and the Rz of the anode surface. The parameters were listed in Table 1. Besides, the electrolytic copper foils also have a similar structure as shown in FIG. 2, all of which have a thickness of 8 μm.

TABLE 1 thickness of the electrolytic copper foils of Examples 1 to 10 (E1 to E10) and Comparative Examples 1 to 6 (C1 to C6) as well as the concentrations of collagen and sodium ions in the copper electrolyte solution and Rz of the anode surface in the preparation

|     | Thickness (μm) | Conc. of Collagen (ppm) | Conc. of Sodium Ions (ppm) | Rz of Anode Surface (μm) |
| --- | --- | --- | --- | --- |
| E1  | 8  | 10 | 10 | 2  |
| E2  | 8  | 20 | 10 | 2  |
| E3  | 8  | 30 | 10 | 2  |
| E4  | 8  | 40 | 10 | 2  |
| E5  | 8  | 20 | 20 | 2  |
| E6  | 8  | 20 | 30 | 2  |
| E7  | 8  | 20 | 10 | 8  |
| E8  | 8  | 20 | 10 | 15 |
| E9  | 6  | 20 | 10 | 2  |
| E10 | 20 | 20 | 10 | 2  |
| C1  | 8  | 5  | 10 | 2  |
| C2  | 8  | 20 | 40 | 2  |
| C3  | 8  | 20 | 5  | 2  |
| C4  | 8  | 20 | 10 | 18 |
| C5  | 8  | 20 | 10 | 20 |
| C6  | 8  | 20 | 10 | 1  |

Test Example 1: Grazing Incidence X-Ray Diffraction (GIXRD)

The electrolytic copper foils of Examples 1 to 10 and Comparative Examples 1 to 6 as test samples were measured by using an X-ray diffractometer to conduct grazing incidence X-ray diffraction experiment. The full width at half maximum (FWHM) of a characteristic peak of (111) plane of the first surface and the FWHM of a characteristic peak of (111) plane of the second surface of each test sample was obtained with the TOPAS software for determination of the surface structures of the first and second surfaces. Results are listed in Table 2 below.

Herein, the instrument and parameters of grazing incidence X-ray diffraction are described as follows:
 I. Measurement Instrument:
 X-ray diffractometer: Bruker D8 ADVANCE Eco.
 II. Measurement Parameters:
 Incidence Angle: 0.8°.

Test Example 2: Nanoindentation Hardness

The electrolytic copper foils of Examples 1 to 10 and Comparative Examples 1 to 6 as test samples were analyzed with the nanoindentation system to obtain the nanoindentation hardness of the first surface and the second surface. Results are listed in Table 2.

Herein, the instrument and parameters of measuring nanoindentation hardness are described as follows:
 I. Measurement Instrument:
 Nanoindentation system: MITS nano indenter XPW system, model: XPW291; and
 Probe tip: Berkovich indenter having a curvature radius equal to or less than 50 nm.

II. Measurement Parameters:
Pressing speed: 0.04 mm/sec; and
Indentation depth: 300 nm.

Test Example 3: Yield Strength

The electrolytic copper foils of Examples 1 to 10 and Comparative Examples 1 to 6 as test samples were analyzed by IPC-TM-650 2.4.4.18 to obtain a stress-strain curve with the strain ($\varepsilon$) as X-axis and the stress ($\sigma$) as Y-axis. A parallel line to the Y-axis was drawn at a strain of 0.5%, and the yield strength was determined by the stress corresponding to the point of the intersection of the stress-strain curve and the line. Results are listed in Table 2.

Herein, the instrument and parameters of measuring yield strength of the electrolytic copper foil are described as follows:
I. Measurement Instrument:
  AG-I universal testing machine, purchased from Shimadzu Corp.
II. Measurement Parameters:
  Sample size: 100 mm (length)×12.7 mm (width);
  Chuck distance: 50 mm; and
  Crosshead speed: 50 mm/min.

Test Example 4: Warpage of Electrolytic Copper Foil

The aforesaid electrolytic copper foils of Examples 1 to 10 and Comparative Examples 1 to 6, which were wound and collected on the guide rollers, were each pulled with a length of 50 centimeters (cm) and placed on a sampling bench. A specimen, including the pulling end as one of sides, was taken in a size of 50 cm×50 cm. Each specimen was put on the sampling bench with the warped surface facing upwards. The height differences between the surface of the sampling bench and two corners of the pulling end were measured with a ruler to obtain two warpage values. The larger one of the two warpage values was expressed as maximum warpage value. The results are listed in Table 2.

Electrode

Examples 1A to 10A and Comparative Examples 1A to 6A: Negative Electrode

The first surfaces and the second surfaces of the electrolytic copper foils of Examples 1 to 10 and Comparative Examples 1 to 6 were each coated with negative electrode slurry comprising negative electrode active substances to become a negative electrode of a lithium-ion cell. Specifically, the negative electrode could be produced by the steps as follows.

First, a negative electrode slurry was prepared, and the composition of the negative electrode slurry is described as follows:
  Mesophase graphite powder (MGP): 93.9 parts by weight, served as negative electrode active substance;
  Conductive carbon black (Super P): 1 part by weight, served as conductive additive;
  Polyvinylidene difluoride (PVDF 6020): 5 parts by weight, served as solvent binder;
  Oxalic acid: 0.1 part by weight; and
  N-methylpyrrolidone (NMP): 60 parts by weight.

Next, the negative electrode slurry was coated on the first surface and the second surface of each of the electrolytic copper foils with a coating thickness of 200 μm on each surface, and then dried for 15 minutes in a 100° C. oven for preliminary removal of water. After that, the electrolytic copper foil coated with negative electrode slurry was pressed by a pressing machine to obtain a pressed electrolytic copper foil, whose density became 1.5 grams per cubic centimeter (g/cm³). The pressed electrolytic copper foil was heated at 120° C. for 10 hours to remove water completely, and finally the negative electrodes of Examples 1A to 10A and Comparative Examples 1A to 6A were obtained.

Herein, the coating conditions and pressing conditions for producing the negative electrode are described as follows:
I. Coating Conditions:
  Coating speed: 5 meters/min (m/min); and
  Coating thickness: about 200 μm on each surface.
II. Pressing Conditions:
  Pressing speed: 1 m/min;
  Pressing pressure: 3000 pounds per square inch (psi);
  Size of the rollers in the pressing machine: 250 mm (outside diameter, φ×250 mm (width);
  Hardness of the rollers: 62 to 65 HRC; and
  Material of the rollers: high-carbon chromium bearing steel (SUJ2).

Lithium-Ion Cell

Examples 1B to 10B and Comparative Examples 1B to 6B: Lithium-Ion Cell

The lithium-ion cell of Examples 1B to 10B and Comparative Examples 1B and 6B were respectively prepared by combining the negative electrodes of Examples 1A to 10A and Comparative Examples 1A and 6A with the same positive electrode. For convenience of description, the process of preparing the lithium-ion cells by using the aforesaid negative electrodes was described as follows.

First, a positive electrode slurry was prepared, and the composition of the positive electrode slurry is described as follows:
  $LiCoO_2$: 89 parts by weight, served as positive electrode substance;
  Flaked graphite (KS6): 5 parts by weight, served as conductive additive;
  Conductive carbon black (Super P): 1 part by weight, served as conductive additive;
  Polyvinylidene difluoride (PVDF 1300): 5 parts by weight, served as solvent binder; and
  N-methylpyrrolidone (NMP): 195 parts by weight.

Next, the positive electrode slurry was coated on two surfaces of an aluminum foil. After the solvent was evaporated, the positive electrode and each of the negative electrodes obtained from examples and comparative examples were cut into a specific size, and then the positive electrode and the negative electrode were alternately stacked with a microporous separator (model: Celgard 2400, manufactured by Celgard Co., Ltd.) sandwiched therebetween, and then placed in a pressing mold filled with the electrolyte solution (model: LBC322-01H, purchased from Shenzhen Capchem Technology Co., Ltd.), and sealed to form a laminated lithium-ion cell. The laminated lithium-ion cell was in a size of 250 mm×154 mm×12 mm.

Test Example 5: Tolerance

To evaluate the tolerance, the lithium-ion cells of Examples 1B to 10B and Comparative Examples 1B and 6B were performed with 400 charge and discharge cycles under the following conditions. After that, each of the lithium-ion cells was disassembled to extract the electrolytic copper foil of the negative electrode therein. The electrolytic copper foil after removing the negative electrode slurry thereon was further cleaned and cut into a size of 150 mm×12.7 mm. The specific size of the cleaned electrolytic copper foil was used as specimen for MIT folding test. In the test example, the tolerance was evaluated by the number that the specimen could withstand repeated folding before fracture. The results of the endurable number of folding after 400 charge and discharge cycles are listed in Table 2.

Herein, the conditions of charge and discharge cycle test are described as follows:
Charging mode: constant current-constant voltage (CCCV);
Discharging mode: constant current (CC);
Charging voltage: 4.2 volts (V);
Charging current: 5C;
Discharging voltage: 2.8 V;
Discharging current: 5C; and
Test temperature: about 55° C.
Herein, the condition of MIT folding test is described as follows:
MIT folding endurance tester: HT-8636A, purchased from HUNGTA;
Folding angle: 135°;
Folding speed: 175 counts per minute (CPM);
Curvature radius: 0.38 mm;
Load: 0.5 kilograms; and
Chuck distance: 92 mm.

process could be improved. Specifically, the maximum warpage value of the electrolytic copper foils of Examples 1 to 10 could be controlled to be less than 5 mm. Lithium-ion cell fabricated by using such electrolytic copper foils could exhibit good tolerance after 400 charge and discharge cycles, that is, the electrolytic copper foils of Examples 1 to 10, obtained from lithium-ion cells that had performed with 400 times of charging and discharging, could withstand at least 50 times of folding process.

For Comparative Examples 1 to 6, the electrolytic copper foils did not have all of features of: (1) suitable absolute difference of FWHM of characteristic peaks of (111) planes of the first and second surfaces, (2) suitable nanoindentation hardness on its first and second surfaces, and (3) more than 230 MPa of yield strength, such that the electrolytic copper foils, obtained from lithium-ion cells that had performed with 400 charge and discharge cycles, could not have good mechanical strength and thus failed to withstand 40 times of folding process. Even if the electrolytic copper foils of Comparative Examples 1 to 3 had maximum warpage value less than 5 mm, the electrolytic copper foils, obtained from lithium-ion cells that had performed with 400 charge and discharge cycles, were fractured before 40 times of folding process. This indicates that the electrolytic copper foils of Comparative Examples 1 to 3 had poor tolerance to the repeated charging and discharging and were not suitable for lithium-ion cells.

TABLE 2

FWHM of characteristic peaks of (111) planes of the $1^{st}$ and $2^{nd}$ surfaces and the absolute difference (AD) therebetween, nanoindentation hardness of the $1^{st}$ and $2^{nd}$ surfaces and the absolute difference (AD) therebetween, yield Strength ($\sigma_y$), maximum warpage value ($W_{max}$), and endurable number of folding after 400 charge and discharge cycles of the electrolytic copper foils of Examples 1 to 10 (E1 to E10) and Comparative Examples 1 to 6 (C1 to C6)

|    | FWHM of characteristic peak of (111) plane | | | Nanoindentation hardness (GPa) | | | | | Endurable number of folding after charge and discharge |
|----|---------|---------|-------|---------|---------|------|---------|-----------|---------|
|    | $1^{st}$ surface | $2^{nd}$ surface | AD | $1^{st}$ surface | $2^{nd}$ surface | AD | $\sigma_y$ (MPa) | $W_{max}$ (mm) | |
| E1 | 0.137 | 0.245 | 0.108 | 0.49 | 1.48 | 0.99 | 240 | 2 | 55 |
| E2 | 0.139 | 0.251 | 0.112 | 0.51 | 1.46 | 0.95 | 295 | 3 | 94 |
| E3 | 0.142 | 0.254 | 0.112 | 0.52 | 1.52 | 1 | 374 | 3 | 135 |
| E4 | 0.131 | 0.252 | 0.121 | 0.51 | 1.48 | 0.97 | 456 | 4 | 201 |
| E5 | 0.141 | 0.255 | 0.114 | 1.39 | 1.50 | 0.11 | 290 | 3 | 90 |
| E6 | 0.138 | 0.247 | 0.109 | 2.28 | 1.46 | 0.82 | 296 | 2 | 77 |
| E7 | 0.264 | 0.246 | 0.018 | 1.13 | 1.48 | 0.35 | 297 | 1 | 92 |
| E8 | 0.378 | 0.246 | 0.132 | 1.82 | 1.51 | 0.31 | 292 | 4 | 79 |
| E9 | 0.141 | 0.253 | 0.112 | 0.61 | 1.46 | 0.85 | 301 | 3 | 111 |
| E10 | 0.143 | 0.254 | 0.111 | 0.64 | 1.47 | 0.83 | 287 | 3 | 106 |
| C1 | 0.135 | 0.251 | 0.116 | 0.48 | 1.47 | 0.99 | 156 | 3 | 23 |
| C2 | 0.140 | 0.252 | 0.112 | 3.56 | 1.45 | 2.11 | 297 | 3 | 36 |
| C3 | 0.141 | 0.257 | 0.116 | 0.26 | 1.46 | 1.2 | 296 | 3 | 38 |
| C4 | 0.394 | 0.251 | 0.143 | 2.33 | 1.48 | 0.85 | 295 | 6 | 19 |
| C5 | 0.421 | 0.253 | 0.168 | 3.04 | 1.47 | 1.57 | 294 | 9 | 12 |
| C6 | 0.072 | 0.258 | 0.186 | 0.44 | 1.47 | 1.03 | 294 | 12 | 8 |

As listed in the above Table 2, the electrolytic copper foils of Examples 1 to 10 all had the features of: (1) suitable absolute difference of FWHM of characteristic peaks of (111) planes of the first and second surfaces (less than 0.14), (2) suitable nanoindentation hardness on its first and second surfaces (0.3 GPa to 3.0 GPa), and (3) more than 230 MPa of yield strength, such that the level of warpage of the electrolytic copper foil was effectively suppressed and the coating quality of the active materials in the subsequent The test results of Comparative Examples 1 to 6 were further studied to obtain the following findings. The electrolytic copper foil of Comparative Example 1 had a yield strength less than 230 MPa, and therefore the electrolytic copper foil, which was obtained from a lithium-ion cell that had performed with 400 charge and discharge cycles, merely withstood 23 times of folding process before fracture. It indicates that the electrolytic copper foil of Comparative Example 1 had poor tolerance to the repeated charge and discharge process. For Comparative Examples 2 and 3, the electrolytic copper foils each had a nanoindentation hardness out of the range between 0.3 GPa and 3.0 GPa on their first surfaces, and therefore the electrolytic copper foils, both obtained from lithium-ion cells each performed with 400 charge and discharge cycles, withstood 36 and 38 times of folding process before fracture, respectively. It also indicates that these electrolytic copper foils exhibited poor tolerance to the repeated charge and discharge process. For Comparative Examples 4 and 6, the absolute difference of FWHM of the characteristic peaks of (111) planes of the first and second surfaces was over 0.14, such that the maximum warpage values of the electrolytic copper foils were more than 5 mm and the coating quality of the active materials was deteriorated. Besides, the electrolytic copper foils of Comparative Examples 4 and 6, both were obtained from lithium-ion cells each performed with 400 charge and discharge cycles, merely withstood 19 and 8 times of folding process before fracture, indicating that these electrolytic copper foils exhibited poor tolerance to the repeated charge and discharge process. For Comparative Example 5, the absolute difference of FWHM of the characteristic peaks of (111) planes of the first and second surfaces was over 0.14 and the nanoindentation hardness of the first surface was out of the range between 0.3 GPa and 3.0 GPa, such that the maximum warpage value of the electrolytic copper foil was more than 5 mm and the coating quality of the active materials was deteriorated. Besides, the electrolytic copper foil of Comparative Example 5, which was obtained from lithium-ion cell that performed with 400 charge and discharge cycles, merely withstood 12 times of folding process before fracture. It is clear that the electrolytic copper foil exhibited poor tolerance to the repeated charge and discharge process.

In conclusion, by controlling the absolute difference of the FWHM of the characteristic peaks of (111) planes of the first and second surfaces, the nanoindentation hardness of the first and second surfaces, and the yield strength of the electrolytic copper foil, it is beneficial to improve the electrolytic copper foil's tolerance to the repeated charging and discharging and reduce its level of warpage, and thus increase the yield rate and value of a lithium-ion cell.

Even though numerous characteristics and advantages of the instant disclosure have been set forth in the foregoing description, together with details of the structure and features of the disclosure, the disclosure is illustrative only. Changes may be made in the details, especially in matters of material, shape, size, and arrangement of parts within the principles of the disclosure to the full extent indicated by the broad general meaning of the terms in which the appended claims are expressed.

What is claimed is:

1. An electrolytic copper foil, comprising a first surface and a second surface opposite the first surface, wherein an absolute difference of a full width at half maximum (FWHM) of a characteristic peak of (111) plane of the first surface and an FWHM of a characteristic peak of (111) plane of the second surface analyzed by grazing incidence X-ray diffraction (GIXRD) is less than 0.14, the first surface and the second surface each have a nanoindentation hardness more than or equal to 0.3 GPa and less than or equal to 3.0 GPa, and a yield strength of the electrolytic copper foil is more than 230 MPa.

2. The electrolytic copper foil as claimed in claim 1, wherein the FWHM of the characteristic peak of (111) plane of the first surface and the FWHM of the characteristic peak of (111) plane of the second surface are each independently 0.10 to 0.38.

3. The electrolytic copper foil as claimed in claim 1, wherein the FWHM of the characteristic peak of (111) plane of the first surface and the FWHM of the characteristic peak of (111) plane of the second surface are each independently 0.13 to 0.38.

4. The electrolytic copper foil as claimed in claim 1, wherein an absolute difference of the nanoindentation hardness of the first surface and the nanoindentation hardness of the second surface of the electrolytic copper foil is 1.0 GPa or less.

5. The electrolytic copper foil as claimed in claim 2, wherein an absolute difference of the nanoindentation hardness of the first surface and the nanoindentation hardness of the second surface of the electrolytic copper foil is 1.0 GPa or less.

6. The electrolytic copper foil as claimed in claim 3, wherein an absolute difference of the nanoindentation hardness of the first surface and the nanoindentation hardness of the second surface of the electrolytic copper foil is 1.0 GPa or less.

7. The electrolytic copper foil as claimed in claim 1, wherein the absolute difference of the FWHM of the characteristic peak of (111) plane of the first surface and the FWHM of the characteristic peak of (111) plane of the second surface is 0.135 or less.

8. The electrolytic copper foil as claimed in claim 7, wherein the absolute difference of the FWHM of the characteristic peak of (111) plane of the first surface and the FWHM of the characteristic peak of (111) plane of the second surface is more than or equal to 0.010 and less than or equal to 0.135.

9. The electrolytic copper foil as claimed in claim 1, wherein the yield strength of the electrolytic copper foil is more than or equal to 240 MPa.

10. The electrolytic copper foil as claimed in claim 2, wherein the yield strength of the electrolytic copper foil is more than or equal to 240 MPa.

11. The electrolytic copper foil as claimed in claim 3, wherein the yield strength of the electrolytic copper foil is more than or equal to 240 MPa.

12. The electrolytic copper foil as claimed in claim 4, wherein the yield strength of the electrolytic copper foil is more than or equal to 240 MPa.

13. The electrolytic copper foil as claimed in claim 5, wherein the yield strength of the electrolytic copper foil is more than or equal to 240 MPa.

14. The electrolytic copper foil as claimed in claim 6, wherein the yield strength of the electrolytic copper foil is more than or equal to 240 MPa.

15. The electrolytic copper foil as claimed in claim 7, wherein the yield strength of the electrolytic copper foil is more than or equal to 240 MPa.

16. The electrolytic copper foil as claimed in claim 8, wherein the yield strength of the electrolytic copper foil is more than or equal to 240 MPa.

17. The electrolytic copper foil as claimed in claim 1, wherein the yield strength of the electrolytic copper foil is more than or equal to 240 MPa and less than or equal to 500 MPa.

18. The electrolytic copper foil as claimed in claim 4, wherein the yield strength of the electrolytic copper foil is more than or equal to 240 MPa and less than or equal to 500 MPa.

19. An electrode of a lithium-ion cell, comprising the electrolytic copper foil as claimed in claim 1.

20. A lithium-ion cell, comprising the electrode as claimed in claim 9.

\* \* \* \* \*